US010824456B2

(12) United States Patent
Singh et al.

(10) Patent No.: US 10,824,456 B2
(45) Date of Patent: Nov. 3, 2020

(54) SYSTEM TRAFFIC ANALYZERS TO REQUEST CO-LOCATION OF VIRTUAL MACHINES IN FREQUENT COMMUNICATION

(71) Applicant: Nutanix, Inc., San Jose, CA (US)

(72) Inventors: Amit Singh, Milpitas, CA (US); Anirban Roy, Milpitas, CA (US); Kranti Yadhati, Fremont, CA (US); Muthukumar Subramanian, Fremont, CA (US); Richard Tia, San Jose, CA (US); Ricky Koo, Los Altos, CA (US); Sambhram Sahoo, Sam Ramon, CA (US); Vijaya Ram Nandula, Santa Clara, CA (US); Yen Vuong Nishida, Sunnyvale, CA (US)

(73) Assignee: Nutanix, Inc., San Jose, CA (US)

( * ) Notice: Subject to any disclaimer, the term of this patent is extended or adjusted under 35 U.S.C. 154(b) by 362 days.

(21) Appl. No.: 15/884,874

(22) Filed: Jan. 31, 2018

(65) Prior Publication Data
US 2019/0235903 A1 Aug. 1, 2019

(51) Int. Cl.
G06F 9/455 (2018.01)
H04L 12/26 (2006.01)
(Continued)

(52) U.S. Cl.
CPC .......... *G06F 9/45558* (2013.01); *H04L 43/08* (2013.01); *G06F 2009/4557* (2013.01);
(Continued)

(58) Field of Classification Search
None
See application file for complete search history.

(56) References Cited

U.S. PATENT DOCUMENTS 7,587,512 B2 * 9/2009 Ta ........................ H04L 41/0893
709/226
8,027,354 B1 9/2011 Portolani et al.
(Continued)

FOREIGN PATENT DOCUMENTS

WO 2012100544 8/2012

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
(Continued)

*Primary Examiner* — Bing Zhao
(74) *Attorney, Agent, or Firm* — Dorsey & Whitney LLP

(57) ABSTRACT

Examples described herein include distributed computing systems having a system traffic analyzer. The system traffic analyzer may receive sampled packets sent to a network from a number virtual machines hosted by computing nodes in the distributed computing system. The packets may be sampled, for example, by network flow monitors in hypervisors of the computing nodes. The system traffic analyzer may request co-location of virtual machines having greater than a threshold amount of traffic between them. The request for co-location may result in the requested virtual machines being hosted on a same computing node, which may in some examples conserve network bandwidth.

22 Claims, 6 Drawing Sheets

(51) Int. Cl.
*H04L 29/12* (2006.01)
*H04L 29/08* (2006.01)

(52) U.S. Cl.
CPC ............... *G06F 2009/45595* (2013.01); *H04L 61/2007* (2013.01); *H04L 67/10* (2013.01)

(56) References Cited

U.S. PATENT DOCUMENTS

| | | | |
|---|---|---|---|
| 8,549,518 | B1 | 10/2013 | Aron et al. |
| 8,601,473 | B1 | 12/2013 | Aron et al. |
| 8,850,130 | B1 | 9/2014 | Aron et al. |
| 9,172,588 | B2 | 10/2015 | Kalyanaraman et al. |
| 9,294,407 | B2 | 3/2016 | Antony |
| 9,772,866 | B1 | 9/2017 | Aron et al. |
| 9,819,607 | B2 | 11/2017 | Tripathi et al. |
| 9,823,943 | B2 | 11/2017 | Mitsunobu et al. |
| 10,127,295 | B2 | 11/2018 | Calder et al. |
| 10,263,842 | B2 * | 4/2019 | Bursell ................. G06F 15/177 |
| 2012/0102190 | A1 * | 4/2012 | Durham .............. G06F 9/45558 709/224 |
| 2013/0258843 | A1 | 10/2013 | Kurita |
| 2018/0060098 | A1 | 3/2018 | Atia et al. |
| 2018/0095776 | A1 | 4/2018 | Tsai et al. |
| 2018/0307512 | A1 | 10/2018 | Balma et al. |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Cano, Ignacio et al. "Curator: Self-Managing Storage for Enterprise Clusters"; University of Washington; published Mar. 2017; pp. all.

* cited by examiner

| | Home  Explore  Analysis  Planning  Extensions  Alerts | | | 🔍 ? ⚙ Admin 👤 |
|---|---|---|---|---|

Entities

| | | |
|---|---|---|
| VMs | 50 | |
| Clusters | 2 | |
| Hosts | 8 | |
| Disks | 36 | |
| Storage Containers | 2 | |
| Flows | 4,857 | |

Focus ▾  Color ▾  Group ▾   ▦ ▦  ▽ Filters

Sort by Bytes ✕ | Type name to filter by | Clear ☆ ▾

4857 Total Flows            ↻  1-20 of 4857 ▾ ‹ ›

| ☐ | SOURCE | DESTINATION | HOST | CLUSTER | APPLICATION | ▾ BYTES |
|---|---|---|---|---|---|---|
| ☐ | example-10 | example-1 | HOST-D | example | ftp | 655.29 MiB |
| ☐ | example-1 | example-10 | HOST-B | example | ftp | 651.04 MiB |
| ☐ | example-14 | example-13 | HOST-C | example | sqlsrv | 431.37 MiB |
| ☐ | example-13 | example-14 | HOST-C | example | sqlsrv | 422.3 MiB |
| ☐ | example-12 | example-11 | HOST-D | example | imap | 400 MiB |
| ☐ | example-11 | example-12 | HOST-B | example | imap | 377.15 MiB |

*FIG. 3*

| VM | | |
|---|---|---|
| ▲ VM NAME | HOST | IP ADDRESSES |
| ○ example-1 | HOST-D | X.Y.X.175 |
| ○ example-10 | HOST-D | X.Y.X.179 |
| ○ example-11 | HOST-B | X.Y.X.174 |
| ○ example-12 | HOST-D | X.Y.X.178 |
| ○ example-13 | HOST-C | X.Y.X.177 |
| ○ example-14 | HOST-C | X.Y.X.176 |
| ○ example-15 | HOST-A | X.Y.X.182 |
| ○ example-16 | HOST-B | X.Y.X.180 |

FIG. 4

SYSTEM TRAFFIC ANALYZERS TO REQUEST CO-LOCATION OF VIRTUAL MACHINES IN FREQUENT COMMUNICATION

TECHNICAL FIELD

Embodiments described herein relate generally to virtual computing systems, and examples of traffic control monitors are described which may affect placement of virtual machines in a computing system.

BACKGROUND

As datacenters scale, operational complexity increases. Additionally, network bandwidth may be a resource of concern in a distributed computing system, such as a virtual computing system. Generally, computing nodes in a distributed computing system may communicate with one another over a network. It may be desirable to reduce traffic over that network while maintaining system performance.

BRIEF DESCRIPTION OF THE DRAWINGS

FIG. 3 is an example of decoded sample packet data arranged in accordance with examples described herein.

FIG. 4 is an example listing of VM identifiers and hosts arranged in accordance with examples described herein.

DETAILED DESCRIPTION

Certain details are set forth below to provide a sufficient understanding of described embodiments. However, it will be clear to one skilled in the art that embodiments may be practiced without various of these particular details. In some instances, well-known computing system components, circuits, control signals, timing protocols, and/or software operations have not been shown in detail in order to avoid unnecessarily obscuring the described embodiments.

Examples described herein include distributed computing systems having a system traffic analyzer. The system traffic analyzer may receive sampled packets sent to a network from a number virtual machines hosted by computing nodes in the distributed computing system. The packets may be sampled, for example, by network flow monitors in hypervisors of the computing nodes. The system traffic analyzer may request co-location of virtual machines having greater than a threshold amount of traffic between them. The request for co-location may result in the requested virtual machines being hosted on a same computing node, which may in some examples conserve network bandwidth.

Figure 1:
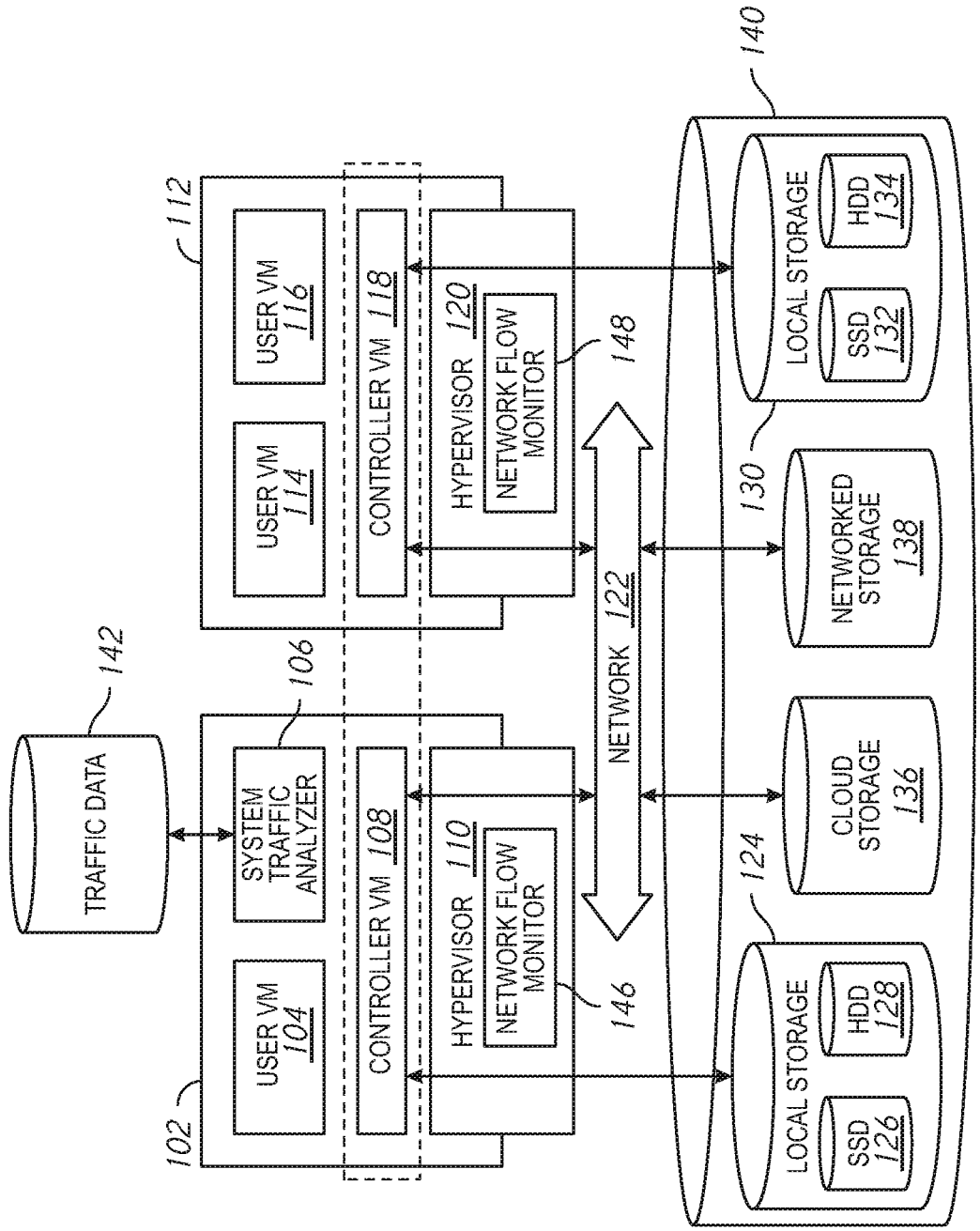
FIG. 1 is a block diagram of a distributed computing system, in accordance with an embodiment of the present invention.

FIG. 1 is a block diagram of a distributed computing system (e.g. a virtual computing system), in accordance with an embodiment of the present invention. The distributed computing system of FIG. 1 generally includes computing node 102 and computing node 112 and storage 140 connected to a network 122. The network 122 may be any type of network capable of routing data transmissions from one network device (e.g., computing node 102, computing node 112, and storage 140) to another. For example, the network 122 may be a local area network (LAN), wide area network (WAN), intranet, Internet, or a combination thereof. The network 122 may be a wired network, a wireless network, or a combination thereof.

The storage 140 may include local storage 124, local storage 130, cloud storage 136, and networked storage 138. The local storage 124 may include, for example, one or more solid state drives (SSD 126) and one or more hard disk drives (HDD 128). Similarly, local storage 130 may include SSD 132 and HDD 134. Local storage 124 and local storage 130 may be directly coupled to, included in, and/or accessible by a respective computing node 102 and/or computing node 112 without communicating via the network 122. Cloud storage 136 may include one or more storage servers that may be stored remotely to the computing node 102 and/or computing node 112 and accessed via the network 122. The cloud storage 136 may generally include any type of storage device, such as HDDs SSDs, or optical drives. Networked storage 138 may include one or more storage devices coupled to and accessed via the network 122. The networked storage 138 may generally include any type of storage device, such as HDDs SSDs, or optical drives. In various embodiments, the networked storage 138 may be a storage area network (SAN).

The computing node 102 is a computing device for hosting virtual machines (VMs) in the distributed computing system of FIG. 1. The computing node 102 may be, for example, a server computer, a laptop computer, a desktop computer, a tablet computer, a smart phone, or any other type of computing device. The computing node 102 may include one or more physical computing components, such as processors.

The computing node 102 is configured to execute a hypervisor 110, a controller VM 108 and one or more user VMs, such as user VMs 104, 106. The user VMs including user VM 104 and 106 are virtual machine instances executing on the computing node 102. In some examples, the VM 106 may be a system traffic analyzer as shown in FIG. 1 and described herein. In other examples, a system traffic analyzer may be separate from the computing node 102. The user VMs including user VM 104 and 106 may share a virtualized pool of physical computing resources such as physical processors and storage (e.g., storage 140). The user VMs including user VM 104 and 106 may each have their own operating system, such as Windows or Linux. While a certain number of user VMs are shown, generally any number may be implemented.

While a system traffic analyzer 106 is shown implemented as a user VM in FIG. 1, in other examples, the system traffic analyzer may be located elsewhere in the distributed computing system. For example, system traffic analyzers described herein may be implemented as user VMs, in bare metal, in the cloud, or in another location. Generally, system traffic analyzers may be connected (e.g., over network 122) to communicate with network flow monitors described herein to receive sampled packets.

The hypervisor 110 may be any type of hypervisor. For example, the hypervisor 110 may be ESX, ESX(i), Hyper-V, KVM, or any other type of hypervisor. The hypervisor 110 manages the allocation of physical resources (such as storage 140 and physical processors) to VMs (e.g., user VM 104, 106, and controller VM 108) and performs various VM related operations, such as creating new VMs and cloning existing VMs. Each type of hypervisor may have a hypervisor-specific API through which commands to perform various operations may be communicated to the particular type of hypervisor. The commands may be formatted in a manner specified by the hypervisor-specific API for that type of hypervisor. For example, commands may utilize a syntax and/or attributes specified by the hypervisor-specific API. In examples described herein, hypervisors may include a network flow monitor. For example, hypervisor 110 includes network flow monitor 146 and hypervisor 120 includes network flow monitor 148. Examples of network flow monitors include netflow and sflow.

Network flow monitors described herein, such as the network flow monitor 146 and network flow monitor 148 may examine packets sent to and/or from the computing node in which they are operating (e.g., the computing node 102 and computing node 112, respectively). In examples described herein, network flow monitors may sample packets sent to and/or from the computing node in which they are operating. The sampled packets may be sent to a system traffic analyzer described herein, such as system traffic analyzer 106 of FIG. 1.

Controller VMs described herein, such as the controller VM 108 and/or controller VM 118, may provide services for the user VMs in the computing node. As an example of functionality that a controller VM may provide, the controller VM 108 may provide virtualization of the storage 140. Controller VMs may provide management of the distributed computing system shown in FIG. 1. In some examples, the controller VM 108 may include a hypervisor independent interface software layer that provides a uniform API through which hypervisor commands may be provided. Generally, the interface through which a user or VM interacts with the hypervisor may not dependent on the particular type of hypervisor being used. For example, the API that is invoked to create a new VM instance may appear the same to a user regardless of what hypervisor the particular computing node is executing (e.g. an ESX(i) hypervisor or a Hyper-V hypervisor). The controller VM 108 may receive a command through its uniform interface (e.g., a hypervisor agnostic API) and convert the received command into the hypervisor specific API used by the hypervisor 110.

The computing node 112 may include user VM 114, user VM 116, a controller VM 118, and a hypervisor 120. The user VM 114, user VM 116, the controller VM 118, and the hypervisor 120 may be implemented similarly to analogous components described above with respect to the computing node 102. For example, the user VM 114 and user VM 116 may be implemented as described above with respect to the user VM 104 and 106. The controller VM 118 may be implemented as described above with respect to controller VM 108. The hypervisor 120 may be implemented as described above with respect to the hypervisor 110.

Generally, each distributed computing system may have a single system traffic analyzer described herein. Sampled packets from each node in the distributed computing system may be sent to a shared system traffic analyzer (e.g., sampled packets from computing node 102 and computing node 112 may be provided to system traffic analyzer 106 of FIG. 1).

The controller VM 108 and controller VM 118 may communicate with one another via the network 122. By linking the controller VM 108 and controller VM 118 together via the network 122, a distributed network of computing nodes including computing node 102 and computing node 112, can be created.

Controller VMs, such as controller VM 108 and controller VM 118, may each execute a variety of services and may coordinate, for example, through communication over network 122. Services running on controller VMs may utilize an amount of local memory to support their operations. For example, services running on controller VM 108 may utilize memory in local storage 124. Services running on controller VM 118 may utilize memory in local storage 130. Moreover, multiple instances of the same service may be running throughout the distributed system—e.g. a same services stack may be operating on each controller VM. For example, an instance of a service may be running on controller VM 108 and a second instance of the service may be running on controller VM 118.

System traffic analyzer 106 may have some storage attached to it (e.g., a database storing traffic data 142). The storage for the traffic data 142 may be coupled to (e.g., in communication with) the computing node 102. The storage for the system traffic analyzer 106 may be located anywhere in the system, e.g., in the storage 140 or in another location. The system traffic analyzer 106 may access stored associations between 1P addresses and VM identifiers. For example traffic data 142 may include a database, list, or other data structure storing an association between an IP address and VM identifier. For example, IP addresses associated with each of user VM 104, user VM 114, and user VM 116 may be stored associated with an identifier for user VM 104, user VM 114, and user VM 116, respectively. While traffic data 142 is illustrated in FIG. 1 as a single database, in other examples traffic data 142 may be distributed across multiple databases and/or storage devices.

During operation, network flow monitors in the hypervisors of computing nodes described herein may sample packets sent from the nodes onto a network, and provide sampled packets. For example, the network flow monitor 148 may sample packets that user VM 114 and/or user VM 116 send over the network 122. The packets may be sampled, for example by capturing a leading number of bits from each packet to provide sampled packets. The sampled packets from the computing node 112 may be provided to the system traffic analyzer 106. Similarly, the network flow monitor 146 may sample packets sent by the user VM 104 to the network 122 and may provide the sampled packets to the system traffic analyzer 106. Generally, any number of VMs may be located on each computing node, and the network flow monitor provided in the hypervisor of the computing node may sample packets from any and/or all of the VMs hosted by the computing node.

The system traffic analyzer 106 may decode sampled packets received to provide decoded packets. For example, the system traffic analyzer may identify IP addresses and/or other information contained in the sampled packets. Information contained in the sampled packets which may be identified (e.g., decoded) includes, for example, a source IP address, a destination IP address, a source port, a destination port, a protocol, or combinations thereof. The system traffic analyzer may access data associating the IP addresses with VM identifiers. In this manner, the system traffic analyzer 106 may translate IP addresses into VM identifiers and the system traffic analyzer 106 may identify the source VM, the destination VM, and/or the source and/or destination host (e.g., computing node) for any and/or all of the received sampled packets.

The traffic data 142 database may store traffic data that may be based on the decoded packets. For example, the traffic data 142 may include data about number and/or rate of packets sent from and/or to particular VMs. The traffic data 142 may further indicate which VMs are running on which computing nodes (e.g., which computing nodes are hosting the VMs identified).

The system traffic analyzer 106 analyzes the data stored in traffic data 142 and may request virtual machines be migrated based on the traffic data 142. For example, the system traffic analyzer 106 may provide a request to migrate virtual machines when traffic between at least one virtual machine on one computing node (e.g., computing node 102) and at least one virtual machine on a second computing node (e.g., computing node 112) is above a threshold level as reflected in traffic data 142. The threshold level may vary, for example, based on time of day, day of the week, day of the month, season of the year, etc. In this manner, the threshold level may be set such that it is greater than an expected and/or tolerated amount of traffic between two VMs. In some examples, the threshold level may be set as a persistent threshold level such that a request to co-locate the VMs is not generated until traffic between them exceeds a threshold level for greater than a threshold time. In this manner, a transient burst of traffic may not cause a request for co-location. The threshold time may be measured, for example, in milliseconds, seconds, minutes, hours, days, or weeks.

For example, if user VM 104 and user VM 114 are having frequent communication, the system traffic analyzer 106 may request that the user VM 104 and/or user VM 114 be migrated such that they are located on the same computing node. For example, user VM 104 may be migrated to computing node 112 and/or user VM 114 may be migrated to computing node 102. Locating two VMs which are having increased communication (e.g., "chatty VMs") may conserve bandwidth on network 122 because, when co-located, VMs may not require communication over network 122.

Generally, requests for migration provided by system traffic analyzers described herein may be provided to one or more distributed resource scheduler(s). The distributed resource scheduler(s) may be executing on any of the computing nodes in the system of FIG. 1, such as computing node 102 and/or computing node 112. A distributed resource scheduler may receive a request to migrate one or more virtual machines from a system traffic analyzer described herein, such as system traffic analyzer 106. The distributed resource scheduler may determine, based on the request, to migrate one or more virtual machines to be co-located on a same host. The virtual machine migrated, the surviving host selected, and/or timing and other details of a migration may be determined by the distributed resource scheduler. The distributed resource scheduler may take other factors into account in determining if and how to effect a migration. For example, the distributed resource scheduler may also administer anti-affinity schemes, where certain VMs may have a preference against having a same host (e.g., for security or other reasons). Accordingly, in some examples a system traffic analyzer may request a migration, but the distributed resource scheduler may not implement the migration (e.g., if the VMs requested for co-location are also indicated as anti-affinity). In other examples, the distributed resource scheduler will effect a request from the system traffic analyzer. For example, the distributed resource scheduler may receive a request from a system traffic analyzer to co-locate (e.g., host on a same computing node) two VMs. The distributed resource scheduler may migrate VMs such that the requested VMs are located on a same computing node. One VM may be migrated by the distributed resource scheduler to the other VM's host. The surviving host may be selected, for example, by selecting the host which has a lesser amount of current traffic. In some examples, the distributed resource scheduler may receive a request from the system traffic analyzer to co-locate two VMs. In some examples, the distributed resource scheduler may migrate both VMs to a different, third computing node where they may be co-located. In some examples, the surviving host may be a host having a least traffic load of all hosts of the virtual machines to be co-located.

Figure 2A:
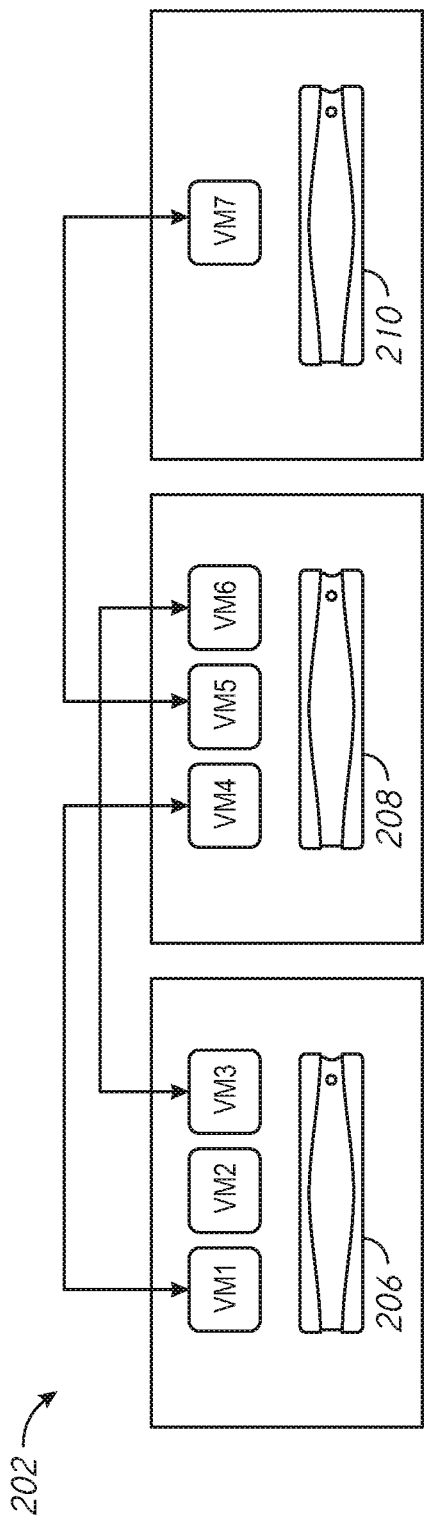
FIG. 2A and FIG. 2B are schematic illustrations of actions of a system arranged in accordance with examples described herein.
Figure 2B:
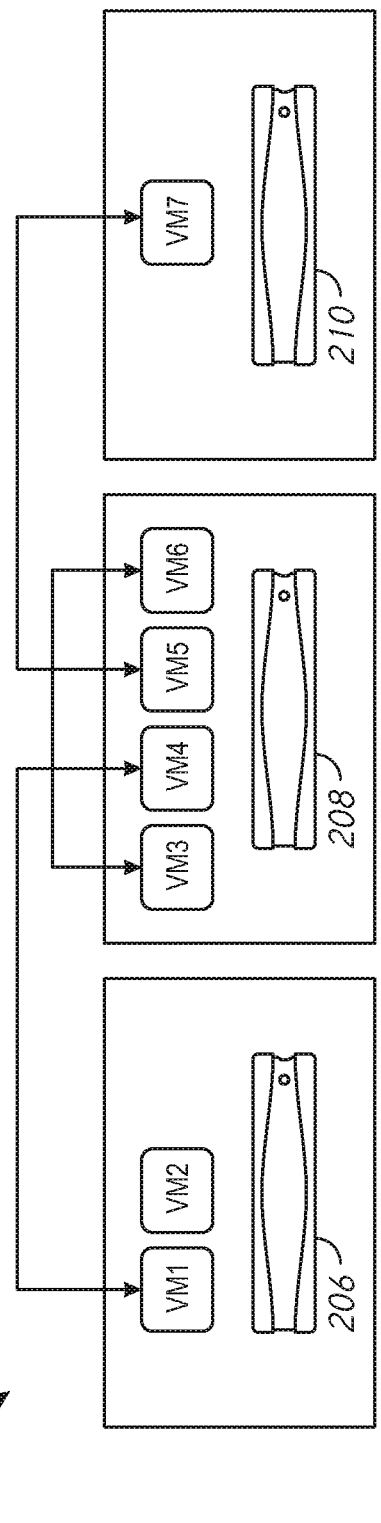

FIGS. 2A and 2B are schematic illustrations of actions of a system arranged in accordance with examples described herein. The systems shown in FIGS. 2A and 2B may be used to implement and/or may be implemented by the system of FIG. 1 in some examples. In the example of FIGS. 2A and 2B, three computing nodes are shown in the distributed computing system—computing node 206, computing node 208, and computing node 210. The system is shown at two time periods—time 202 and time 204. At time 202, the computing node 206 hosts three virtual machines—VM1, VM2, and VM3. At time 202, the computing node 208 hosts three virtual machines—VM4, VM5, and VM6. At time 202, the computing node 210 hosts a single virtual machine VM7.

One of the computing nodes in the system of FIGS. 2A and 2B may host a system traffic analyzer, such as the system traffic analyzer 106 of FIG. 1. In some examples, a system traffic analyzer may be operating in the system on another computing device not shown in FIGS. 2A and 2B. Each of the nodes—computing node 206, computing node 208, and computing node 210 may include a hypervisor having a network flow monitor, e.g., network flow monitor 146 and/or network flow monitor 148. The network flow monitors may provide sampled packets from all computing nodes to the system traffic analyzer. The system traffic analyzer may decode the sampled packets, identify source VM, destination VM, and/or source and destination host computing node, for each of the sampled packets.

In the example of FIGS. 2A and 2B, the system traffic analyzer may determine that traffic between VM3 on computing node 206 and VM6 on computing node 208 exceeds a threshold level. In some example, the system traffic analyzer may determine that traffic between VM3 on computing node 206 and VM6 on computing node 208 has exceeded a threshold level for greater than a threshold time. Responsive to this determination, the system traffic analyzer may request co-location of VM3 and VM6. Responsive to the request, a distributed resource scheduler, which may be operating on any of the computing nodes shown, or on another computing system in communication with the system of FIGS. 2A and 2B, may migrate at least one VM to achieve the co-location. In the example of FIGS. 2A and 2B, the distributed resource scheduler at time 204 has migrated VM3 from computing node 206 to computing node 208. At time 204, the virtual machines VM3 and VM6 are co-located on a same computing node and no longer require a between-node network for communication. This may advantageously conserve network bandwidth in some examples.

While in this example, two VMs are shown as being co-located, any number may be requested to be co-located by system traffic analyzers described herein, including 3, 4, 5, 6, 7, 8, 9, 10, or another number of VMs.

FIG. 3 is an example of decoded sample packet data arranged in accordance with examples described herein. The data shown in FIG. 3 may be stored, for example, in traffic data 142 of FIG. 1 in some examples. FIG. 3 illustrates a source, destination, host, cluster, application, and size (e.g., "bytes") column. A system traffic analyzer, such as system traffic analyzer 106 of FIG. 1, may populate the columns as it decodes each received sample packet. Reviewing a first line of data shown in FIG. 3 (which represents a packet), the packet originated from source VM having the VM identifier 'example-10'. VM identifiers may be text strings, numerical strings, or combinations thereof. Reviewing that first line of data again, the destination VM had the VM identifier 'example-1'. The host sending the packet had a host identifier (e.g., name) "HOST-D". The cluster (e.g., distributed system) sending the packet had a cluster identifier 'example'. The application associated with the packet was ftp. The number of bytes in the packet was 655.29 MB.

Reviewing the second line of data, representing a second sampled packet, in FIG. 3, the source VM sending the packet had a VM identifier of '-example-1', the destination VM for receipt of the packet had a VM identifier of '-example-10'. The host computing node sending the packet was "HOST-B", the cluster sending the packet was 'example', the application sending the packet was ftp, and the bandwidth was 651.04 MB.

In the example of FIG. 3, the system traffic analyzer, such as the system traffic analyzer 106 of FIG. 1, may identify that there is traffic between "example-10" and "example-1" which exceeds a threshold level. Note that "example-10" and "example-1" are hosted on different hosts. Accordingly, the system traffic analyzer may request that the VMs be migrated such that they are co-located.

FIG. 4 is an example listing of VM identifiers and hosts arranged in accordance with examples described herein. As described with reference to FIG. 3, a system traffic analyzer may request co-location of the VMs identified by 'example-1' and 'example-10'. The request may be provided to a dynamic resource scheduler, which may affect the request. FIG. 4 is an illustration of a table associating VM identifiers (e.g., names) with hosts. The data in FIG. 4 is displayed after the dynamic resource scheduler effected the request to co-locate 'example-1' and 'example-10'. As can be seen in FIG. 4, 'example-1' and 'example-10' are both now hosted on the host named "HOST-D", which previously only hosted "example-10". In other examples, the surviving host could have been the host of "example-1". In other examples, both "example-10" and "example-1" may have been migrated to a different common host.

Figure 5:
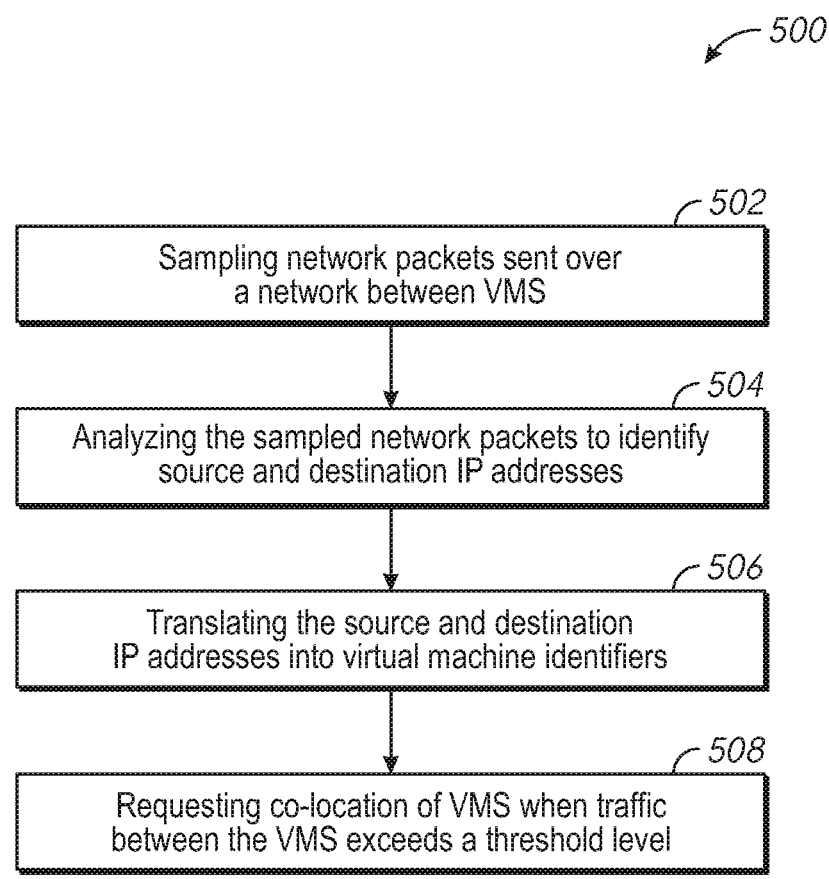
FIG. 5 is a flowchart illustrating a method arranged in accordance with examples described herein.

FIG. 5 is a flowchart illustrating a method arranged in accordance with examples described herein. The method 500 includes block 502, block 504, block 506, and block 508. In some examples, the blocks may be provided in a different order. In some examples, additional and/or fewer blocks may be used.

In block 502, network packets that are sent over a network between VMs may be sampled. The network packets may be sampled by network flow monitors provided in one or more hypervisors. For example, referring to FIG. 1, packets sent between computing node 102 and computing node 112 may be sampled by network flow monitor 146 and network flow monitor 148, respectively. The sampling may include copying and/or accessing a leading number of bits of each packet. In some examples, the sampling may include accessing a different predetermined region of bits of each packet. Each packet transmitted by the computing node over the network 122 may be sampled in some examples. In some examples, fewer than each packet may be sampled—e.g., every other packet, every fifth packet, every tenth packet, every 100th packet, every 1000th packet, etc. The sampled network packets may be provided to a system traffic analyzer, e.g., system traffic analyzer 106 of FIG. 1.

In block 504, which may follow block 502, the sampled network packets may be analyzed (e.g., by the system traffic analyzer) to identify source and destination IP addresses. In some examples, the sampled network packets may be decoded by the system traffic analyzer, which may aid in identifying the source and destination IP addresses.

In block 506, which may follow block 504, the source and destination IP addresses may be translated into virtual machine identifiers (e.g., virtual machine names). For example, the system traffic analyzer 106 of FIG. 1 may access data (e.g., data in traffic data 142) that associates IP addresses with virtual machine identifiers. The source and destination IP addresses, source and destination virtual machine identifiers, and/or other data discerned from the sampled network packets may be stored—in traffic data 142 of FIG. 1. Other data may include host name of a computing node hosting the source VM, size, and/or application originating the packet.

In block 508, which may follow block 506, a request may be provided to co-locate VMs when traffic between the VMs exceeds a threshold level. The requested may be provided by system traffic analyzers described herein based on traffic data accumulated by the system traffic analyzers (e.g., by system traffic analyzer 106 of FIG. 1 based on traffic data 142). The threshold level may be set specific to a VM, host, application, or time of day, week, year, month, etc. In some examples, the request may not be made unless the traffic exceeds a threshold level for greater than a threshold time to avoid requesting a migration following a short traffic increase.

In some examples, the request provided in block 508 may be sent to a scheduler (e.g., a dynamic resource scheduler), which may affect the request if allowed in combination with other rules enforced by the dynamic resource scheduler (e.g., in view of any anti-affinity rules preventing co-location of certain VMs). The dynamic resource scheduler may further determine which computing node should host the co-located VMs in accordance with resource usage at the candidate host VMs. In some examples, the surviving host hosting the co-located VMs nay be one of the hosts initially hosting one of the VMs requested to be co-located.

Figure 6:
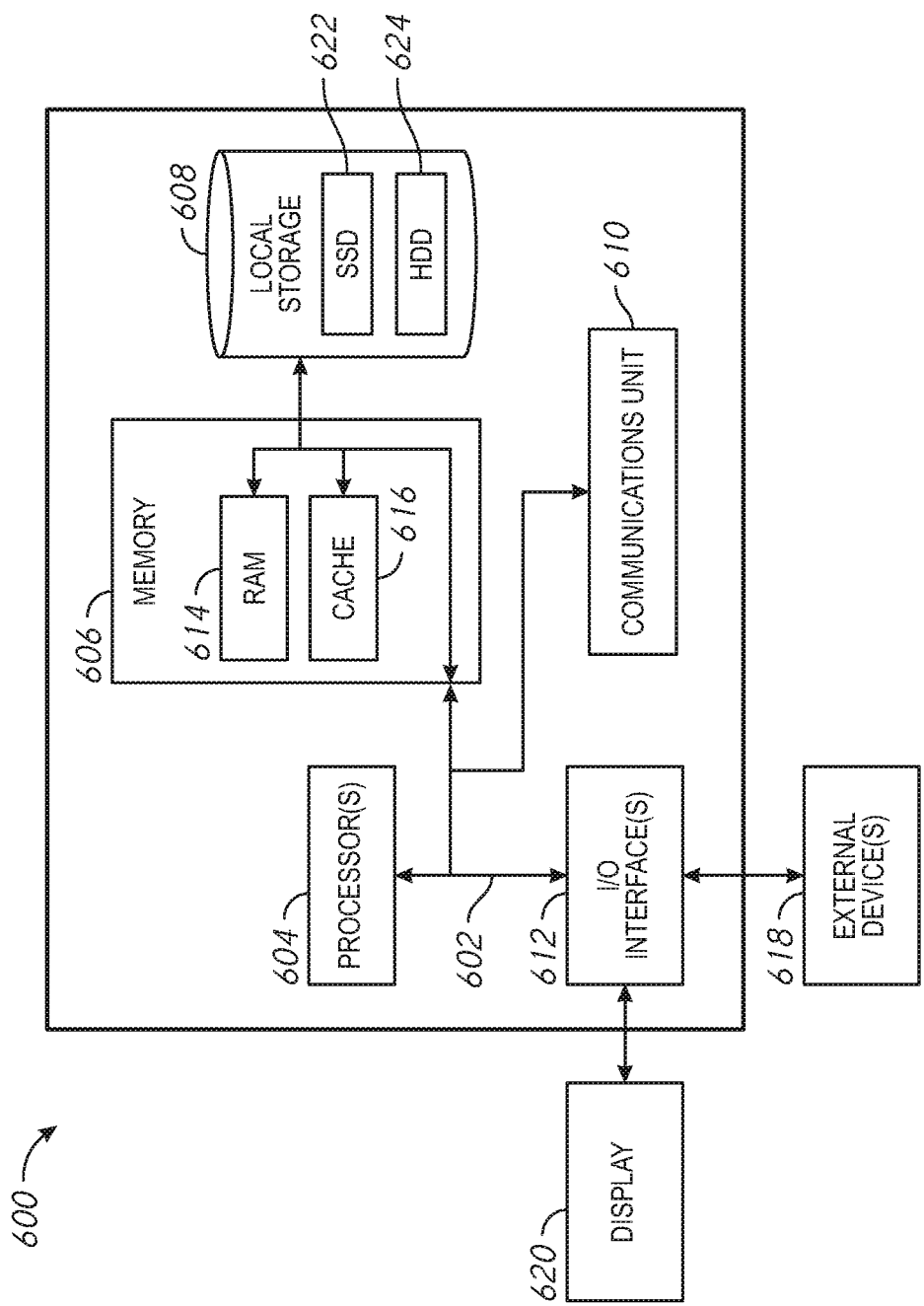
FIG. 6 depicts a block diagram of components of a computing node 200 in accordance with an embodiment of the present invention.

FIG. 6 depicts a block diagram of components of a computing node 600 in accordance with an embodiment of the present invention. It should be appreciated that FIG. 6 provides only an illustration of one implementation and does not imply any limitations with regard to the environments in which different embodiments may be implemented. Many modifications to the depicted environment may be made. The computing node 600 may implemented as and/or may be used to implement the computing node 102 and/or computing node 112 of FIG. 1.

The computing node 600 includes a communications fabric 602, which provides communications between one or more processor(s) 604, memory 606, local storage 608, communications unit 610, I/O interface(s) 612. The communications fabric 602 can be implemented with any architecture designed for passing data and/or control information between processors (such as microprocessors, communications and network processors, etc.), system memory, peripheral devices, and any other hardware components within a system. For example, the communications fabric 602 can be implemented with one or more buses.

The memory 606 and the local storage 608 are computer-readable storage media. In this embodiment, the memory 606 includes random access memory RAM 614 and cache 616. In general, the memory 606 can include any suitable volatile or non-volatile computer-readable storage media. The local storage 608 may be implemented as described above with respect to local storage 124 and/or local storage 130. In this embodiment, the local storage 608 includes an SSD 622 and an HDD 624, which may be implemented as described above with respect to SSD 126, SSD 132 and HDD 128, HDD 134 respectively.

Various computer instructions, programs, files, images, etc. may be stored in local storage 608 for execution by one or more of the respective processor(s) 604 via one or more memories of memory 606. In some examples, local storage 608 includes a magnetic HDD 624. Alternatively, or in addition to a magnetic hard disk drive, local storage 608 can include the SSD 622, a semiconductor storage device, a read-only memory (ROM), an erasable programmable read-only memory (EPROM), a flash memory, or any other computer-readable storage media that is capable of storing program instructions or digital information.

In some examples, computer instructions may be stored in local storage 608 for implementing, when executed by processor(s) 604, a system traffic analyzer described herein, such as the system traffic analyzer 106 of FIG. 1.

The media used by local storage 608 may also be removable. For example, a removable hard drive may be used for local storage 608. Other examples include optical and magnetic disks, thumb drives, and smart cards that are inserted into a drive for transfer onto another computer-readable storage medium that is also part of local storage 608.

Communications unit 610, in these examples, provides for communications with other data processing systems or devices. In these examples, communications unit 610 includes one or more network interface cards. Communications unit 610 may provide communications through the use of either or both physical and wireless communications links.

I/O interface(s) 612 allows for input and output of data with other devices that may be connected to computing node 600. For example, I/O interface(s) 612 may provide a connection to external device(s) 618 such as a keyboard, a keypad, a touch screen, and/or some other suitable input device. External device(s) 618 can also include portable computer-readable storage media such as, for example, thumb drives, portable optical or magnetic disks, and memory cards. Software and data used to practice embodiments of the present invention can be stored on such portable computer-readable storage media and can be loaded onto local storage 608 via I/O interface(s) 612. I/O interface(s) 612 also connect to a display 620.

Display 620 provides a mechanism to display data to a user and may be, for example, a computer monitor.

From the foregoing it will be appreciated that, although specific embodiments have been described herein for purposes of illustration, various modifications may be made while remaining with the scope of the claimed technology.

What is claimed is:

1. A distributed system comprising:
a first computing node configured to host a first virtual machine and a first network flow monitor, wherein the first network flow monitor is configured to capture a subset of bits of packets sent from the first virtual machine;
a second computing node configured to host a second virtual machine and a second network flow monitor, wherein the second network flow monitor is configured to capture a subset of bits of packets sent from the second virtual machine;
a system traffic analyzer configured to decode the subset of bits of packets sent from the first and second virtual machines to determine traffic data, wherein the traffic data includes a respective source virtual machine identifier and a respective destination virtual machine identifier for each of the subsets of bits,
wherein the system traffic analyzer is further configured to analyze the respective source and destination virtual machine identifiers included in the traffic data to determine traffic exchanged between the first virtual machine and the second virtual machine, wherein the system traffic analyzer is further configured to request migration of the second virtual machine to the first computing node in response to a determination that the traffic exchanged between the first virtual machine and the second virtual machine exceeds a dynamic threshold level for a defined threshold period of time, wherein the dynamic threshold level is scheduled to have a first value during a first portion of a day and is scheduled to have a second value that is different than the first value during a second portion of the day.

2. The distributed system of claim 1, wherein the system traffic analyzer comprises a virtual machine on the first computing node or the second computing node.

3. The distributed system of claim 1, further comprising a distributed resource scheduler configured to receive the request to migrate the second virtual machine and, responsive to the request, to migrate the second virtual machine to the first computing node from the second computing node.

4. The distributed system of claim 1, wherein the first network flow monitor is configured to sample packets by capturing a leading number of bits from a packet as the subset of bits to provide the first sampled packets.

5. The distributed system of claim 1, wherein the system traffic analyzer is configured to translate IP addresses from the first sampled packets and the second sampled packets into the respective source and destination virtual machine identifiers of the traffic data.

6. The distributed system of claim 1, wherein the system traffic analyzer is further configured to identify a host computing node associated with a sampled packet of the first sampled packets for inclusion in the traffic data.

7. The distributed system of claim 1, wherein the system traffic analyzer is further configured to request migration of the second virtual machine to the first computing node further in response to the first computing node having a smaller traffic load than the second computing node.

8. The distributed system of claim 7, wherein, when the first computing node has a larger traffic load than the second computing node, the system traffic analyzer is further configured to request migration of the first virtual machine to the second computing node in response to a determination that the traffic exchanged between the first virtual machine and the second virtual machine exceeds the dynamic threshold level for the defined threshold period of time.

9. A method comprising:
sampling network packets sent over a network by first and second virtual machines hosted on first and second computing nodes, respectively, of a distributed computing system, by capturing a respective subset of bits of network packets, wherein the network packets are sampled by first and second network flow monitors hosted on the first and second computing nodes, respectively;
analyzing, via system traffic analyzer hosted on a computing node of the distributed computing system, the respective subset of bits to identify respective source and destination Internet protocol (IP) addresses; and
translating, via system traffic analyzer, the respective source and destination IP addresses into respective virtual machine identifiers; and
analyzing, via the system traffic analyzer, the respective virtual machine identifiers translated from the respective subset of bits to determine traffic exchanged between the first virtual machine and the second virtual machine; and requesting co-location of the first virtual and the second virtual machine to a same computing node of the distributed computing system when the traffic exchanged between the first and second virtual machines exceeds a dynamic threshold level for a defined threshold period of time, wherein the dynamic threshold level is scheduled to have a first value during a first portion of a day and is scheduled to have a second value that is different than the first value during a second portion of the day.

10. The method of claim 9 wherein the same computing node comprises one of the first or second computing nodes.

11. The method of claim 9, wherein translating the respective source and destination IP addresses into the respective virtual machine identifiers comprises accessing a database configured to store correlations between IP addresses and virtual machine identifiers in the distributed computing system.

12. The method of claim 10, further comprising selecting the one of the first or second computing nodes based on a difference in respective traffic loads of the first and second computing nodes.

13. The method of claim 12, further comprising selecting the one of the first or second computing nodes having a smaller respective traffic load.

14. A computing node comprising:
at least one processor;
computer readable media encoded with instructions which, when executed by the at least one processor cause the computing node to:
  receive, from first and second network flow monitors hosted on first and second computing nodes, respectively, first and second subsets of bits captured from first and second network packets sent to and from the first and second computing nodes, respectively; and
  decode respective bits of each of the first and second sampled packets to determine traffic data, wherein the traffic data includes a respective source virtual machine identifier and a respective destination virtual machine identifier for each of the first and second sampled packets;
  analyze the respective source and destination virtual machine identifiers included in the traffic data to determine traffic exchanged between a first virtual machine hosted on the first computing node and a second virtual machine hosted on the computing node; and
  request co-location of the first virtual machine and the second virtual machine to a same computing node in response to a determination that the traffic exchanged between the first virtual machine and the second virtual machine exceeds a dynamic threshold level for a defined threshold period of time, wherein the dynamic threshold level is scheduled to have a first value during a first portion of a day and is scheduled to have a second value that is different than the first value during a second portion of the day.

15. The computing node of claim 14, wherein the instructions, when executed by the at least one processor cause the computing node to receive the first and second sampled packets from the first and second network flow monitors hosted on respective first and second hypervisors executing on the first and second computing nodes.

16. The computing node of claim 14, wherein the instructions, when executed by the at least one processor cause the computing node to translate IP addresses encoded in the bits of the first and second sampled packets into the respective source and destination virtual machine identifiers included in the traffic data.

17. The computing node of claim 14, wherein the instructions, when executed by the at least one processor cause the computing node to store a source, destination, and host from each of the first and second sampled packets in a database as the traffic data.

18. The computing node of claim 14, wherein the instructions, when executed by the at least one processor cause the computing node to request co-location of the first and second virtual machines to one of the first or second computing nodes selected based on which of the first and second virtual machines has a least traffic load.

19. At least one non-transitory, computer-readable storage medium including with instructions which, when executed by a computing node, cause the computing node to:
  receive, from first and second network flow monitors hosted on first and second computing nodes, respectively, first and second subsets of bits captured from first and second network packets sent to and from the first and second computing nodes, respectively; and
  decode respective bits of each of the first and second sampled packets to determine traffic data, wherein the traffic data includes a respective source virtual machine identifier and a respective destination virtual machine identifier for each of the first and second sampled packets;
  analyze the respective source and destination virtual machine identifiers included in the traffic data to determine traffic exchanged between a first virtual machine hosted on the first computing node and a second virtual machine hosted on the computing node; and
  request co-location of the first virtual machine and the second virtual machine to a same computing node in response to a determination that the traffic exchanged between the first virtual machine and the second virtual machine exceeds a dynamic threshold level for a defined threshold period of time, wherein the dynamic threshold level is scheduled to have a first value during a first portion of a day and is scheduled to have a second value that is different than the first value during a second portion of the day.

20. The at least one non-transitory, computer-readable storage medium of claim 19, wherein the instructions, when executed by the computing node cause the computing node to translate IP addresses encoded in the bits of the first and second sampled packets into the respective source and destination virtual machine identifiers included in the traffic data.

21. The at least one non-transitory, computer-readable storage medium of claim 19, wherein the instructions, when executed by the computing node cause the computing node to request co-location of the first and second virtual machines to one of the first or second computing nodes selected based on which of the first and second virtual machines has a least traffic load.

22. The at least one non-transitory, computer-readable storage medium of claim 19, wherein the instructions, when executed by the computing node cause the computing node to request co-location of the first and second virtual machines to a third computing node.

* * * * *